May 1, 1945.　　　J. H. MURCH　　　2,374,694
FEEDING DEVICE
Filed Nov. 18, 1942　　　4 Sheets-Sheet 2

INVENTOR.
John H. Murch
BY
Ivan D. Thornburgh
Charles H. Erne
ATTORNEYS

May 1, 1945.  J. H. MURCH  2,374,694
FEEDING DEVICE
Filed Nov. 18, 1942    4 Sheets-Sheet 3

INVENTOR.
John H. Murch
BY Ivan D. Thornburgh
Charles H. Erne
ATTORNEYS

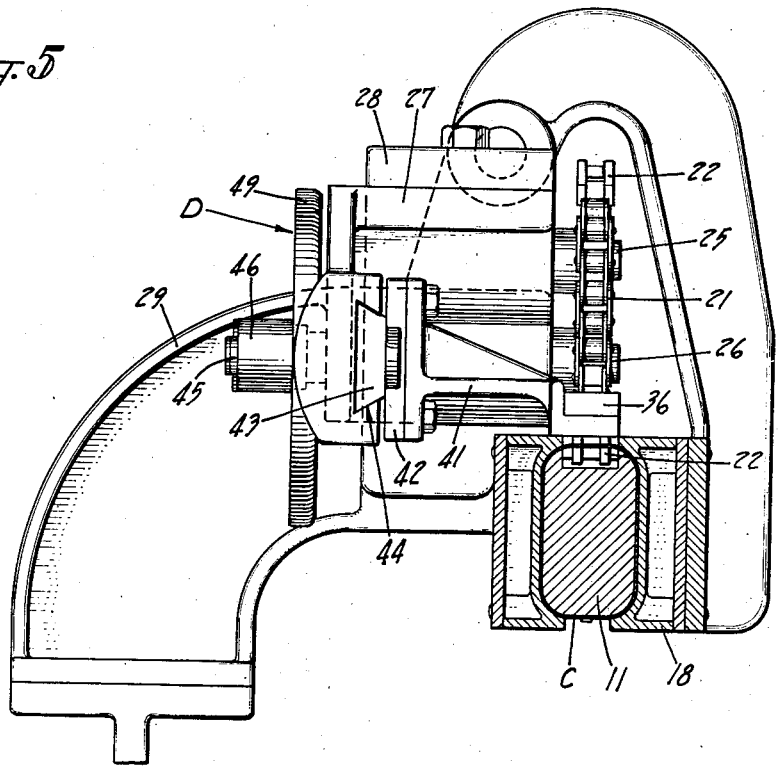
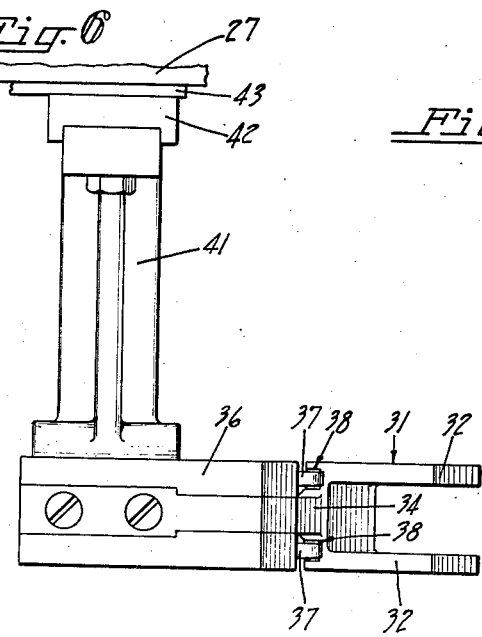
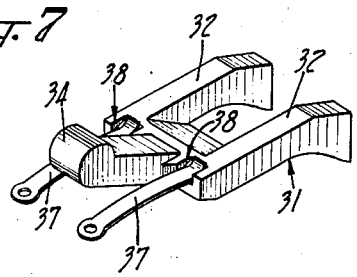

Patented May 1, 1945

2,374,694

UNITED STATES PATENT OFFICE 2,374,694

FEEDING DEVICE

John H. Murch, East Orange, N. J., assignor to American Can Company, New York, N. Y., a corporation of New Jersey Application November 18, 1942, Serial No. 466,036

4 Claims. (Cl. 198—106)

The present invention relates to feeding devices for propelling sheet metal can bodies in timed order along a predetermined path of travel from a delivery mechanism subject to untimed stoppage leaving the can body in an indeterminate position to a constantly operating receiving mechanism and has particular reference to an auxiliary feeding device for insuring the proper placing of a can body in the receiving mechanism irrespective of its irregular stopped position.

In the manufacture of sheet metal can bodies which require a side seam soldering operation it is customary to form the body in a forming section of a can making machine and to effect the soldering operation in a soldering section. These two sections are connected by an extension of the forming mandrel of the forming section of the machine and the bodies, as they are formed, are propelled along the mandrel by feeding devices which advance them in timed order and deliver them into a feeding device of the soldering section of the machine.

The soldering section of the machine involving high heats by its nature should be a continuously operating mechanism while the forming section is subject to frequent stops by reason of jams and other abnormal causes. When the forming section of the machine stops it leaves the last can body on the mandrel in an indeterminate position usually being only partially advanced.

Hence when a feed finger of the feeding devices of the soldering section comes into position to receive the can body, the partially advanced or improperly located can body is in the path of the feed finger which strikes the side of the body instead of passing in behind its rear edge. This causes damage to the can body and often wrecks the machine.

The instant invention contemplates overcoming this difficulty by providing an auxiliary feeding device which is located adjacent the receiving end of the soldering section of the machine and which operates continuously with the feeding devices of this section. This auxiliary feeding device does no work while both the delivery mechanism and the receiving mechanism are operating in cooperation under normal conditions, but immediately picks up a partially advanced can body, when the stoppage of the delivery mechanism leaves the body in such improper position, and feeds it into the receiving mechanism in the usual timed order so that damage to the body or machine is prevented.

An object, therefore, of the invention is the provision in a can making machine having a delivery feed mechanism subject to untimed stoppage and a receiving feed mechanism continuously operating, of auxiliary feeding devices which operate to feed into the receiving feed mechanism in the proper timed order a can body left in improper position adjacent the receiving feed mechanism by stoppage of the delivery feed mechanism, this preventing damage to can body and to the machine.

Another object is the provision in such a machine of a reciprocable auxiliary feeding device which is actuated by and in timed relation with a continuously operating receiving feed mechanism and which feeds only can bodies which have been improperly advanced by a reciprocating delivery feed mechanism which has ceased operation for any reason, such auxiliary feeding device bringing the improperly positioned can bodies into the correct position within the receiving feed mechanism so that damage to the bodies and to the machine is prevented.

Numerous other objects and advantages of the invention will be apparent as it is better understood from the following description, which, taken in connection with the accompanying drawings, discloses a preferred embodiment thereof.

Referring to the drawings:

Fig. 5 is a transverse sectional view taken substantially along the broken line 5—5 in Fig. 1, with parts broken away;

Fig. 6 is an enlarged top plan view of a feed finger support used in the machine; and Fig. 7 is an enlarged perspective view of a feed finger and its holding springs as used in the feed finger support.

Figure 1:
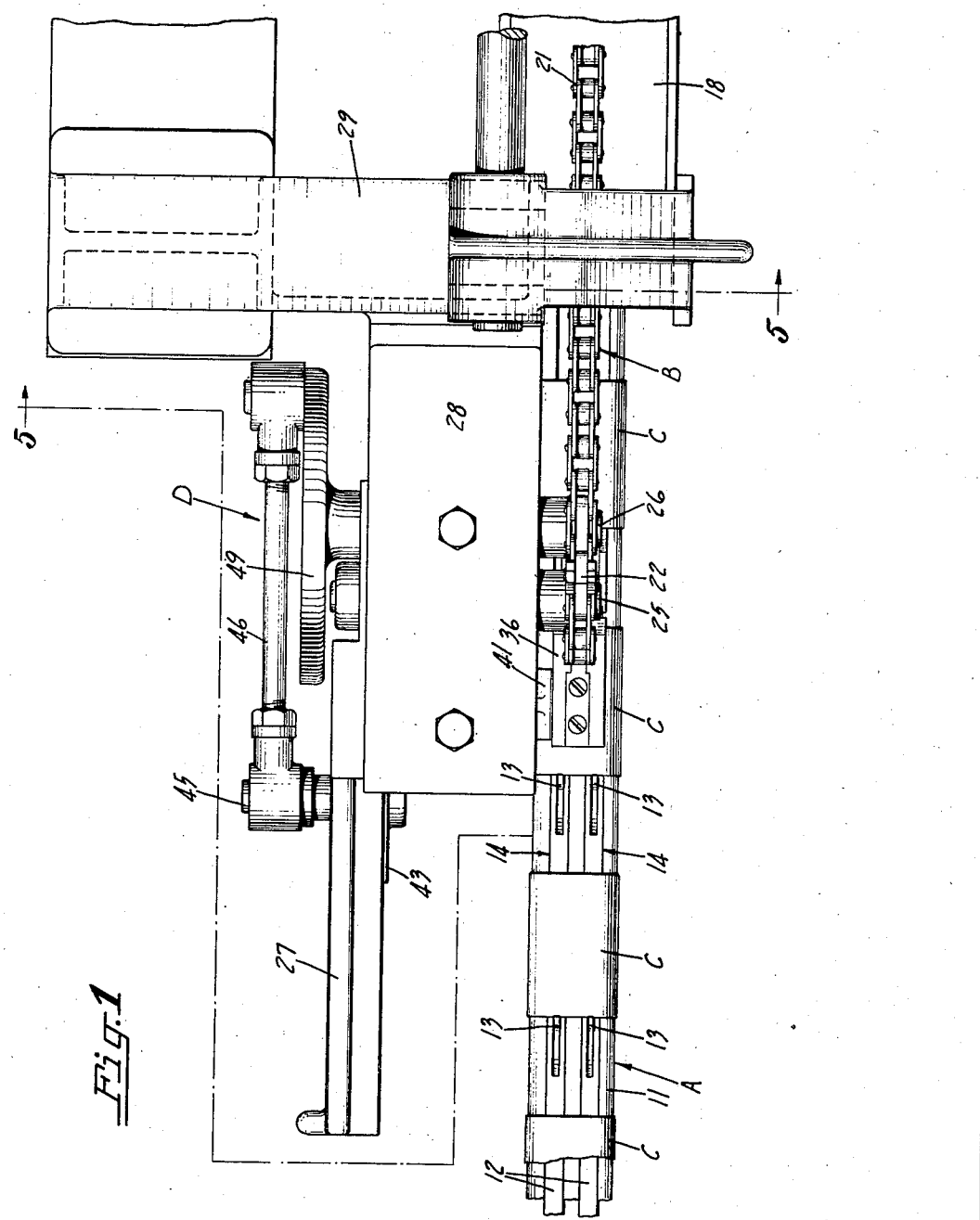
Figure 1 is a top plan view of a can making machine embodying the instant invention, with parts broken away, the view showing a procession of can bodies passing through the machine.

As a preferred embodiment of the instant invention the drawings illustrate principal parts of a delivery feed mechanism A (Figs. 1 and 2) of a forming section of a can body machine and a receiving feed mechanism B of a side seam soldering section of the machine, the two sections being incorporated in the usual manner in a can making machine of the character disclosed in United States Patent 2,135,532, issued November 8, 1938, to J. G. Reid, on Fluxing device.

In such a can body making machine, can bodies C (Figs. 1 and 2) are properly shaped on an inside mandrel 11 (see also Fig. 5) which forms a part of the body forming section A of the machine. While on this mandrel the side seam edges of the formed bodies are interfolded and locked together and are bumped to produce a side seam ready for soldering.

These forming operations are performed on the can bodies while they are advanced along the mandrel 11 in a step-by-step or intermittent manner. This advancement of the can bodies is brought about preferably by a pair of spaced and parallel feed bars 12 which carry depressible feed fingers 13 (see also Fig. 4) spaced at equal intervals along the length of the bars. The feed bars slidably reciprocate in longitudinal grooves 14 formed in the mandrel. The bars are reciprocated in time with the other moving parts of the machine in any suitable manner.

The inside mandrel 11 extends beyond the forming section A of the machine and connects with the receiving or entrance end of the soldering section B. In this soldering section, the can bodies are received in an outside horse 18 (Figs. 1 and 5) which is usual in a machine of this kind and which forms a continuation of travel for the bodies passing from the mandrel.

The can bodies C are propelled through this horse 18 by a continuously moving endless chain conveyor 21 (Figs. 1 and 2) having gripper fingers 22 spaced at equal intervals along the chain. The chain operates over sprockets 23, 24 (only the receiving end of the chain being illustrated) which are mounted on respective shafts 25, 26 journaled in suitable bearings formed in support members 27 located at each end of the soldering section of the machine. The support members are bolted to overhanging brackets 28 which are secured to members 29 of the main frame of the machine.

One of the shafts 25, 26 and its sprocket serves as a driving instrumentality for moving the conveyor chain 21. This shaft may be driven in any suitable manner, preferably from a continuously operating separate source of power or a continuously operating source of power separable from the forming section of the machine, but in any case operating in time with the forming section.

Under normal operation of the machine, as when the forming section A and the soldering section B are in simultaneous operation, the can bodies C after being formed on the mandrel 11 are fed in a step-by-step advancement by the feed fingers 13 of the reciprocating feed bars 12 along the mandrel toward its outer end where the preceding formed can body on the mandrel is delivered in proper position into the outside horse of the soldering section. The conveyor 21, of the soldering section, operating in time with the reciprocating feed bars 12, immediately picks up the received can body and advances it through the horse with a continuous movement. The gripper fingers 22 on the conveyor engage behind the rear edge of the can bodies to effect this advancement.

If for any reason the forming section A of the machine stops operating, the soldering section B continues to operate and thus propels the can bodies in the horse away from the usual soldering devices in this section so that the bodies will be prevented from becoming burned by the excessive heat of the soldering devices. When such a stoppage of the forming section occurs during the forward or feeding stroke of the feed bars 12, the foremost or preceding formed can on the mandrel 11 is left in a partially advanced position so that the side of the body instead of its rear edge is in the path of travel of the approaching gripper finger 22 of the conveyor 21. Hence when the gripper finger comes into position to pick up the body it engages its side wall and crushes or cuts through the body and usually damages the finger and the chain and the machine parts associated with them, as hereinbefore mentioned.

In order to prevent such damage to the can body and to the machine, provision is made to insure the proper advancement of the preceding can on the mandrel 11 regardless of the indeterminate position in which it is left by the feed bars 12 when the forming section of the machine stops operating. This is brought about by an auxiliary feeding device D which is maintained in continuous operation by the soldering section conveyor 21 and which is located adjacent the receiving end of the conveyor.

The auxiliary feeding device D includes a reciprocable feed finger 31 (Figs. 2, 6 and 7) which moves along in the rear of and coincidently with the preceding can body on the mandrel 11. This finger is formed with two spaced and parallel prongs 32 (Fig. 7) which are adapted to engage the rear edge of the preceding can body in a manner which prevents interference with the feed fingers 13 and the gripper fingers 22.

The auxiliary feed finger 31 is also formed with a rearwardly extending pivot lug 34 which is retained in a cylindrical pivot seat 35 (see Fig. 3) formed in a head block 36 disposed above the mandrel 11. A pair of flat springs 37 located one on each side of the finger in recesses 38 formed in the finger, hold the finger prongs 32 in alignment with the edge of an advancing body, but permit of a slight raising of the finger when it moves back over the top of the next following body in the procession, as will be hereinafter explained. These finger springs are secured to the head block 36.

Figure 2:
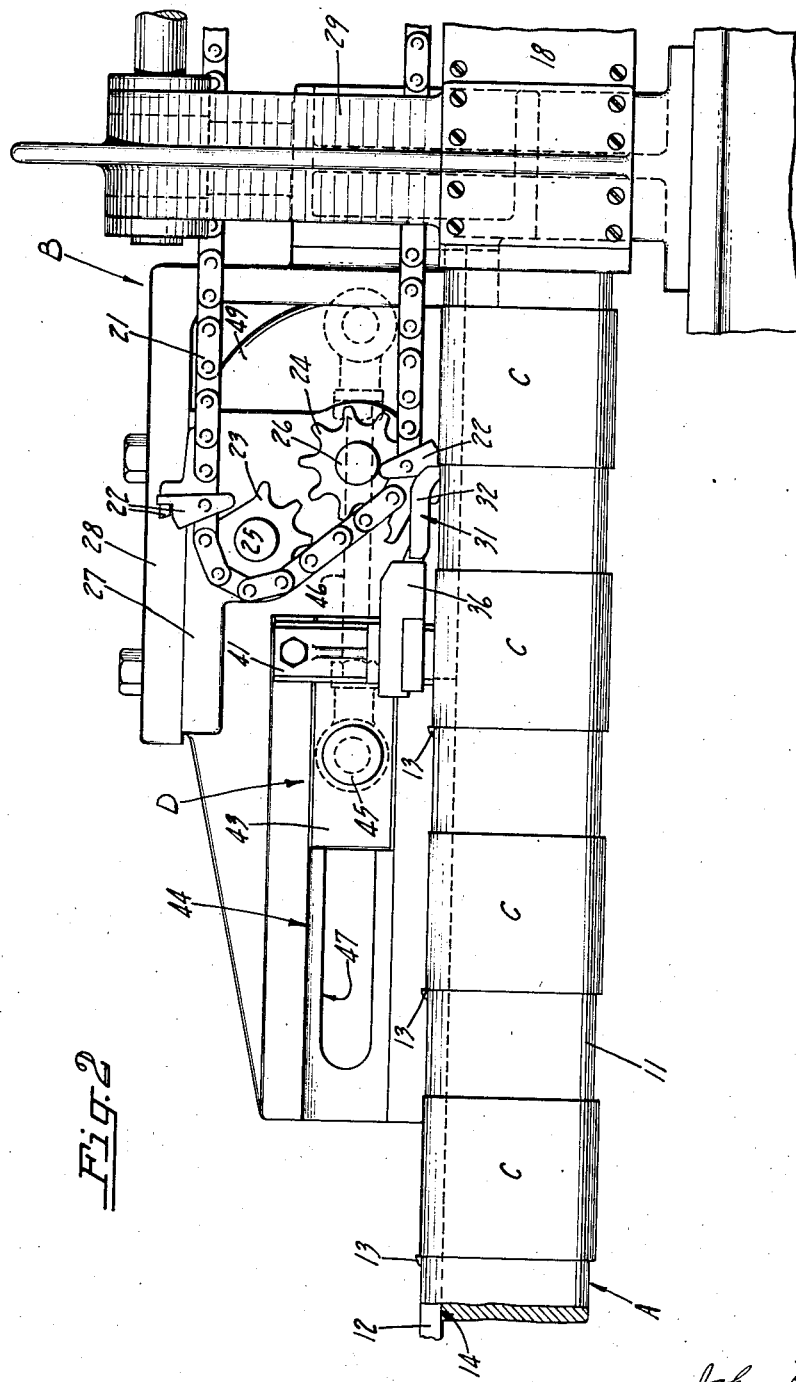
Fig. 2 is a side elevation of the machine shown in Fig. 1, with parts broken away and parts shown in section, the view illustrating a procession of can bodies in the machine.

The head block 36 is secured to the outer end of a movable bracket 41 (Figs. 5 and 6) which at its inner end is bolted to a pad 42 of a reciprocable slide block 43 (see also Fig. 2). The slide block operates in a longitudinal slideway 44 formed in the support member 27. The slide block is connected by a pivot pin 45 to one end of a connecting rod 46 (Figs. 1 and 2). The pin is secured in the block and extends through an elongated slot 47 in the support member 27. The opposite end of the connecting rod is pivotally mounted on a crank disc 49 which is secured to the conveyor sprocket shaft 26.

Hence as the sprocket shaft 26 rotates with the continuously operating conveyor 21, it turns the disc 49 and through its connecting rod 46 reciprocates the slide block 43 and the bracket and feed finger 31 carried thereon, through a forward or advancing stroke and thence through a rearward or return stroke in time with the movement of the conveyor 21. The feed finger 31 is thus kept in continuous reciprocating motion as long as the soldering conveyor 21 remains in operation.

The reciprocating feed finger 31 moves in time with the reciprocating feed bars 12 and has the same length of stroke as the feed bars. The feed finger thus traverses the full portion of the mandrel 11 over which the preceding can body C passes as the body is delivered into the soldering section of the machine.

Figure 3:
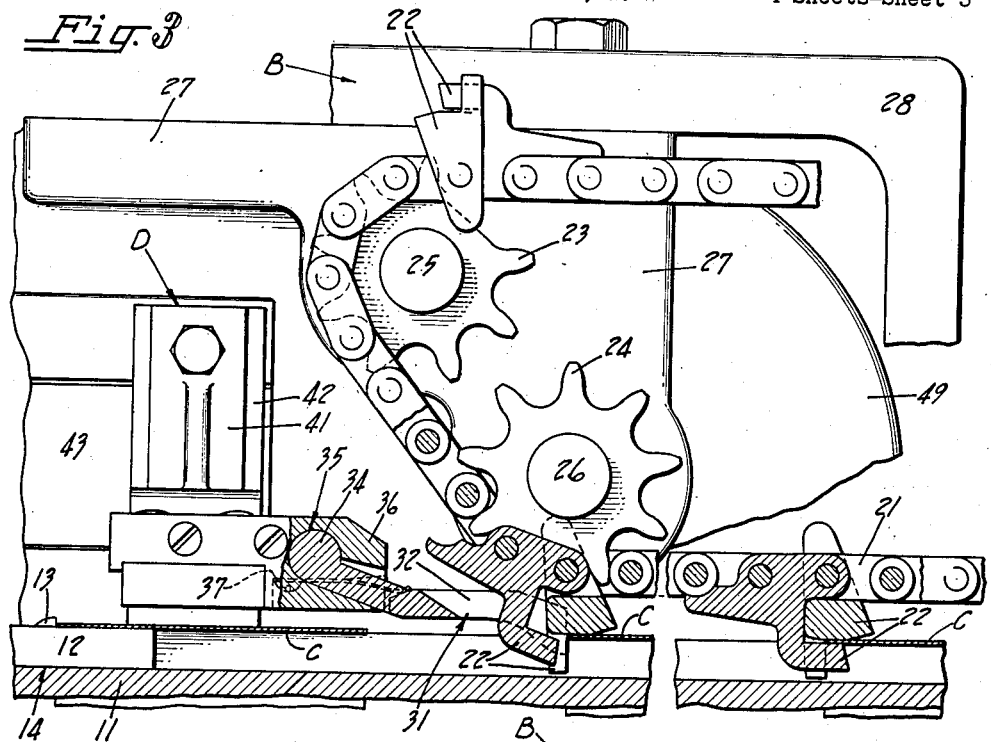
Figs. 3 and 4 are enlarged sectional details showing certain of the moving parts of the machine in different positions.
Figure 4:
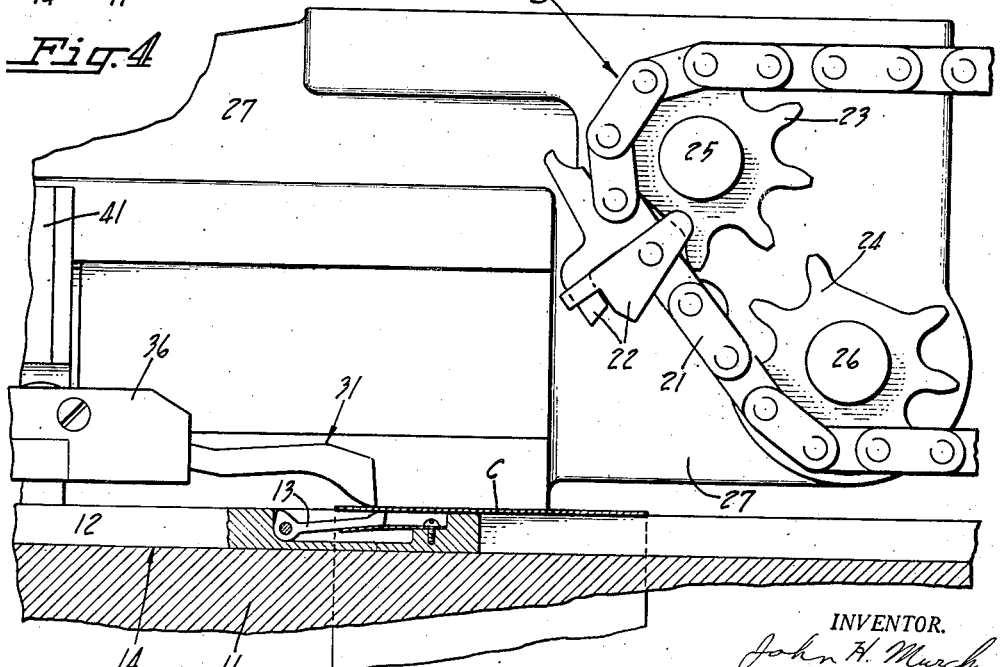

Under normal operating conditions, as the said can body C on the mandrel 11 is shifted along the mandrel for delivery into the soldering section of the machine, the auxiliary feed finger 31 moves along a path of travel parallel with the forming section feed bars 12 and in a position behind the rear edge of but not touching the advancing can body until the latter is fully delivered into the grip of the conveyor 21 in the soldering section of the machine, as best shown in Figs. 2 and 3. As the forming section feed bars 12 move back through a return stroke for engagement of their feed fingers 13 behind the next following can bodies in the procession on the mandrel, the auxiliary feed finger also moves back through a return stroke to a position behind the next following body. It is while moving back through this return stroke that the auxiliary feed finger rides up onto and across the next following can body in the procession, as shown in Fig. 4 to a position in spaced relation to the rear edge of the body in readiness for the next forward stroke as hereinbefore mentioned.

When the feed bars 12 stop in an indeterminate position on a forward or feeding stroke due to the stoppage of the forming section of the machine, and thus leave the can body in only a partially advanced position, the auxiliary feed finger, moving in time with the feed bars but being actuated continuously by the conveyor 21, immediately contacts the rear edge of the partially advanced body and delivers the body fully and in proper timed relation into the receiving feed mechanism B in a position where it is readily engaged by the gripper fingers 22 (Fig. 3) of the conveyor 21 for further advancement. It is this construction of auxiliary feed device that insures delivery of the preceding formed can body C on the mandrel 11 into the conveyor 21 when the delivery mechanism stops operating, thereby preventing damage to the body and also to the forming machine mechanism.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In combination, a continuously operating receiving feed mechanism, a delivery feed mechanism for propelling can bodies along a predetermined path of travel and for normally delivering the bodies directly to said receiving feed mechanism, and an auxiliary feed means disposed between said feed mechanisms and operated by and in synchronism with said receiving feed mechanism, said auxiliary feed means being normally spaced behind and having no feeding relation to said can bodies and engaging only a can body left in a partially advanced and improper feeding position by abnormal operation of said delivery mechanism, so as to advance the body into said receiving feed mechanism.

2. In combination, a continuously operating receiving feed mechanism, a delivery feed mechanism for propelling a can body along a predetermined path of travel and for normally delivering the body directly to said receiving feed mechanism, and a continuously operating auxiliary feed means disposed between said feed mechanisms actuated by and in timed relation with said receiving feed mechanism, said auxiliary feed means being normally spaced in the rear of the can bodies being propelled by said delivery feed mechanism and engaging only can bodies left in a partially advanced and improper feeding position by abnormal operation of said delivery mechanism, so as to advance said bodies in the same direction into said receiving feed mechanism.

3. In a can making machine, the combination of an intermittently operable delivery feed mechanism for propelling can bodies along a predetermined path of travel in processional order, a continuously operating receiving feed mechanism disposed adjacent said delivery feed mechanism for receiving the can bodies therefrom, and a continuously reciprocable auxiliary feed finger actuated by and in time with said receiving feed mechanism and operable in time with and spaced from the rear of the foremost can body being propelled by said delivery feed mechanism for engaging the rear end of said can body to advance it in the same direction into said receiving feed mechanism in time with the movement of the latter when the can body is left in a partially advanced and improper feeding position by stoppage of the delivery feed mechanism.

4. In a can making machine, the combination of a support for the can bodies, an intermittently operable reciprocating bar delivery feed mechanism carried by said support for propelling can bodies therealong, a support for receiving the can bodies from said first mentioned support, a continuously operating chain conveyor disposed adjacent said last mentioned support for receiving the can bodies from said delivery feed bars and for propelling them along said last mentioned support, an auxiliary feed finger disposed adjacent the receiving end of said conveyor, means for supporting said auxiliary feed finger, and a continuously operating mechanism actuated by and synchronized with said conveyor and connecting with said supporting means for continuously reciprocating said auxiliary feed finger in time with said conveyor and along the path of travel of and in time with the movement of the foremost can body on said support for engaging the rear end of the latter to deliver it in timed order into said receiving conveyor when said can body is left in a partially advanced position by the delivery feed bars when the delivery feed mechanism stops operating.

JOHN H. MURCH.